Patented Jan. 18, 1927.

1,614,883

UNITED STATES PATENT OFFICE.

JOSEPH G. DAVIDSON, OF PITTSBURGH, PENNSYLVANIA, ASSIGNOR TO CARBIDE & CARBON CHEMICALS CORPORATION, A CORPORATION OF NEW YORK.

PROCESSES OF MAKING ETHYLENE GLYCOL MONOALKYL ETHERS.

No Drawing.   Application filed February 7, 1924. Serial No. 691,297.

The invention is a process of preparing ethylene glycol monoalkyl ethers by a reaction involving elthylene glycol, an alkali, and an alkyl ester.

Prior methods of making ethylene glycol monoalkyl ethers have ordinarily necessitated the use of metallic sodium. For example, sodium ethylene glycollate is produced by acting upon ethylene glycol with metallic sodium, and the glycollate, heated with ethyl iodid, yields the glycol ether. While such processes are satisfactory for laboratory use, they are not adapted for commercial work. So far as I am aware no attempt has been made to prepare the product in large quantities and its industrial possibilities have not been investigated.

According to the present invention, an efficient, simplified process is provided in which an alkali, preferably sodium hydroxid, instead of metallic sodium, is used. The process may be carried out in a single reaction step and employs reagents of relatively low cost. Some of the more important commercial applications of the product are noted hereinafter.

A preferred form of the process is as follows: Ethylene glycol, sodium hydroxid, and diethyl sulfate or equivalent ethyl ester, are mixed in substantially the proportions indicated by the following equation:

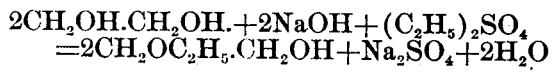

The glycol and diethyl sulfate may be of the ordinary commercial grade, and the sodium hydroxid is preferably in solid state. Aqueous solutions of the hydroxid may be used, but these should be concentrated, as the presence of considerable amounts of water ordinarily reduces the yield. Diethyl sulfate is ordinarily used in slight excess.

The reaction mixture is boiled under a reflux condenser for about three hours. Then it is vacuum distilled and the distillate is redistilled under atmospheric pressure. The yield of glycol monoethyl ether is usually 60% of the theoretical, or more.

The product is a colorless liquid boiling around 134° C., has a density of about .930 at 15° C., and is soluble in a number of liquids, including water, glycerine, ethylene glycol, amyl acetate, and butyl acetate. It is non-toxic and non-intoxicating.

I have discovered that ethylene glycol monoethyl ether has valuable industrial applications, especially as a solvent for gums, resins, cellulose esters, and the like. A further important use for the product is as an extraction agent or menstruum for essential oils, in the manufacture of flavors and perfumes. It may be said in general that the glycol ether has some of the solvent characteristics of both alcohols and ethers. It is especially adapted to serve as a substitute for solvents containing or consisting of ethyl alcohol, and solutions made up with it ordinarily have a color, density, and viscosity resembling that of alcoholic solutions. The glycol ether dissolves most of the essential oils and its own slight odor does not detract from nor disguise that of the dissolved substance. Various composite solvents may be made including the glycol ether and water, alcohols, ethers, esters, or other compounds.

The invention is not restricted to the specific process described and various modifications may be made within the scope of the appended claims.

I claim:

1. Process of making an ethylene glycol monoalkyl ether, comprising effecting a reaction between ethylene glycol, an alkali, and an alkyl ester.

2. Process of making ethylene glycol monoethyl ether, comprising effecting a reaction between ethylene glycol, sodium hydroxid, and diethyl sulfate.

3. Process of making ethylene glycol monoethyl ether, comprising boiling a mixture containing ethylene glycol, an alkali metal hydroxid, and diethyl sulfate, condensing evolved vapors and returning the condensate to the reaction mixture, and separating the ethylene glycol monoethyl ether from the reaction mixture.

In testimony whereof, I affix my signature.

JOSEPH G. DAVIDSON.